United States Patent [19]

Meldrum

[11] Patent Number: 5,274,810
[45] Date of Patent: Dec. 28, 1993

[54] DYNAMIC CONTROL OF PROGRAM EXECUTION ORDER ON A PERSONAL COMPUTER

[75] Inventor: David R. Meldrum, North Andover, Mass.

[73] Assignee: Bull HN Information Systems Inc., Billerica, Mass.

[21] Appl. No.: 295,730

[22] Filed: Jan. 10, 1989

[51] Int. Cl.$^5$ .................. G06F 15/00; G06F 15/16
[52] U.S. Cl. .................. 395/700; 364/281.8; 364/DIG. 1; 364/138; 395/200
[58] Field of Search ............. 364/200, 881.8, 132, 364/138, 900, 401, 281.8, DIG. 1; 395/700, 550, 325, 650, 200

[56] References Cited

U.S. PATENT DOCUMENTS

| | | | |
|---|---|---|---|
| 4,414,624 | 11/1983 | Summer, Jr. et al. | 364/200 |
| 4,564,901 | 1/1986 | Tomlinson et al. | 364/200 |
| 4,636,948 | 1/1987 | Gdaniec et al. | 395/650 |
| 4,642,756 | 2/1987 | Sherrod | 364/200 |
| 4,780,821 | 10/1988 | Crossley | 364/200 |
| 4,782,442 | 11/1988 | Kojima et al. | 364/200 |
| 4,825,354 | 4/1989 | Agrawal et al. | 364/200 |
| 4,851,994 | 7/1989 | Toda et al. | 364/401 |
| 4,939,509 | 7/1990 | Bartholomew et al. | 340/717 |
| 4,949,248 | 8/1990 | Caro | 364/401 |
| 4,969,092 | 11/1990 | Shorter | 395/650 |
| 5,031,089 | 7/1991 | Liu et al. | 395/725 |
| 5,036,484 | 7/1991 | McCoy et al. | 395/500 |

OTHER PUBLICATIONS

*Microsoft MS-DOS User's Guide and User's Reference*, Microsoft Corp. Redmond, Wash., Chapter 4, 1987.
Duncan, Ray, *Advanced MS-DOS Programming*, Chapters 12 and 13, Microsoft Press, Redmond, Wash., 1988.

*Primary Examiner*—Michael R. Fleming
*Assistant Examiner*—Glenn A. Auve
*Attorney, Agent, or Firm*—Gerald J. Cechony; Gary D. Clapp; John S. Solakian

[57] ABSTRACT

A personal computer (PC) operating with terminal emulation software as a terminal to mainframe host computer has means for dynamically reordering the programs it runs other than the terminal emulation software. It has provision for receiving program names from the host computer and for running the programs so specified without operator intervention. It may then re-enter the terminal emulation software, again without operator intervention.

1 Claim, 4 Drawing Sheets

STARTUP PROGRAM

DYNAMIC CONTROL OF PROGRAM EXECUTION ORDER ON A PERSONAL COMPUTER

FIELD OF THE INVENTION

This invention relates to digital computer systems, particularly to digital computer systems comprising a mainframe host computer and a plurality of personal computers (PC's) which may operate in terminal emulation mode as terminals of the mainframe host computer, and most particularly to controlling the order of program execution in the PC's without operator intervention.

BACKGROUND OF THE INVENTION

References

*Microsoft MS-DOS User's Guide and User's Reference*, Microsoft Corporation, Redmond, Wash., Document No. 410630001-330-R09-0787.

*Advanced MS-DOS Programming*, Second Edition, 1988, Ray Duncan, Microsoft Press, Redmond, Wash. ISBN 1-55615-156-8. (Hereinafter referred to as "Duncan".)

In recent years the "personal computer" (PC) has become a very common adjunct to the computing scene. A PC may be loosely defined as a computer system that may be purchased for under five-thousand dollars and which occupies, at most, only a portion of a desktop.

While numerous embodiments of PC's abound, most fall into two categories: 1) those manufactured by Apple Computer Company; and 2) those manufactured by International Business Machines Corporation (IBM) and the numerous "clones" thereof, i.e., machines manufactured by other than IBM, but compatible with IBM's PC's. The IBM-compatible category includes several variants, widely known as the "PC", the "PC-XT", and the "PC-AT", which can all generally run the same programs but which differ in execution speed. Virtually all such machines utilize an operating system known as "MS-DOS", supplied by Microsoft Corporation of Redmond, Wash. The present application is slanted toward the IBM-compatible genre of PC's.

Prior to the introduction of PC's into the workplace, many work environments already had computing systems comprising mainframe computers to which a plurality of terminals were connected (as by a Local Area Network, or "LAN"). A plurality of users would each have a terminal conveniently near, as on their desks. To gain the advantages of PC's without having to sacrifice any of the advantages of the mainframe systems (e.g., access to programs that were written for the mainframe, probably in a programming language not compatible with the PC), and without having to resort to the expense and inconvenience of placing both a terminal and a PC on a user's desk, it became commonplace to provide PC's with "terminal emulation" software. This provides a user with the option of using his PC in free-standing mode, or, by running the terminal emulation program, of using his PC as a terminal connected to the mainframe.

One drawback of this mode of operation is that the terminal emulation program may take up quite a bit of the available RAM (random-access memory) space in the PC, and thus may not leave sufficient space for other programs to run in the PC at the same time. For example, if a user is using his PC in terminal emulation mode to access a desktop publishing program in the mainframe, and if the desktop publishing program wishes to display a "graphic" to the user on his monitor, there may not be sufficient RAM space in the PC for the terminal emulation software and the graphics display software at the same time. This would make it incumbent upon the user, after the graphics information had been forwarded from the mainframe, to exit from the terminal emulation program, run the graphics software in the PC to display the graphic, and then resume operation of the terminal emulation software.

Ways have been sought to allow the mainframe to effect this control of program ordering in the remote PC's, but none have become readily available. The nearest thing provided is the "batch processing" function within MS-DOS. (See, generally, Chapter 4 (pp. 131 et. seq.) of the MS-DOS User's Reference.) This function allows the creation of a "batch file" containing a sequence of MS-DOS commands which will then be sequentially executed. Since the batch file can include commands to run particular programs, this does allow for a sequence of programs to be run. However, the sequence of programs is fixed at the time the batch file is created, and there is no provision to dynamically modify it. It is thus of little value in an interactive scenario in which the order in which it will be desired to run programs is not known ahead of time.

THE PRESENT INVENTION

The present invention provides a way of dynamically ordering the sequence of programs to be run in a personal computer by providing an area in RAM in which may be enqueued the names of programs to be run, and by providing a program which may be called by program interrupt which interrogates the queue and interrupts the operating system with orders to run the programs whose names are found on the queue.

OBJECTS OF THE INVENTION

It is thus an object of the present invention to provide a means for dynamically specifying the order in which programs are to be executed on a personal computer without intervention by the user.

Other objects and advantages of the present invention will become apparent to one skilled in the art after reviewing the ensuing description of the preferred embodiment and the appended drawings, wherein:

THE PREFERRED EMBODIMENT

Figure 1:
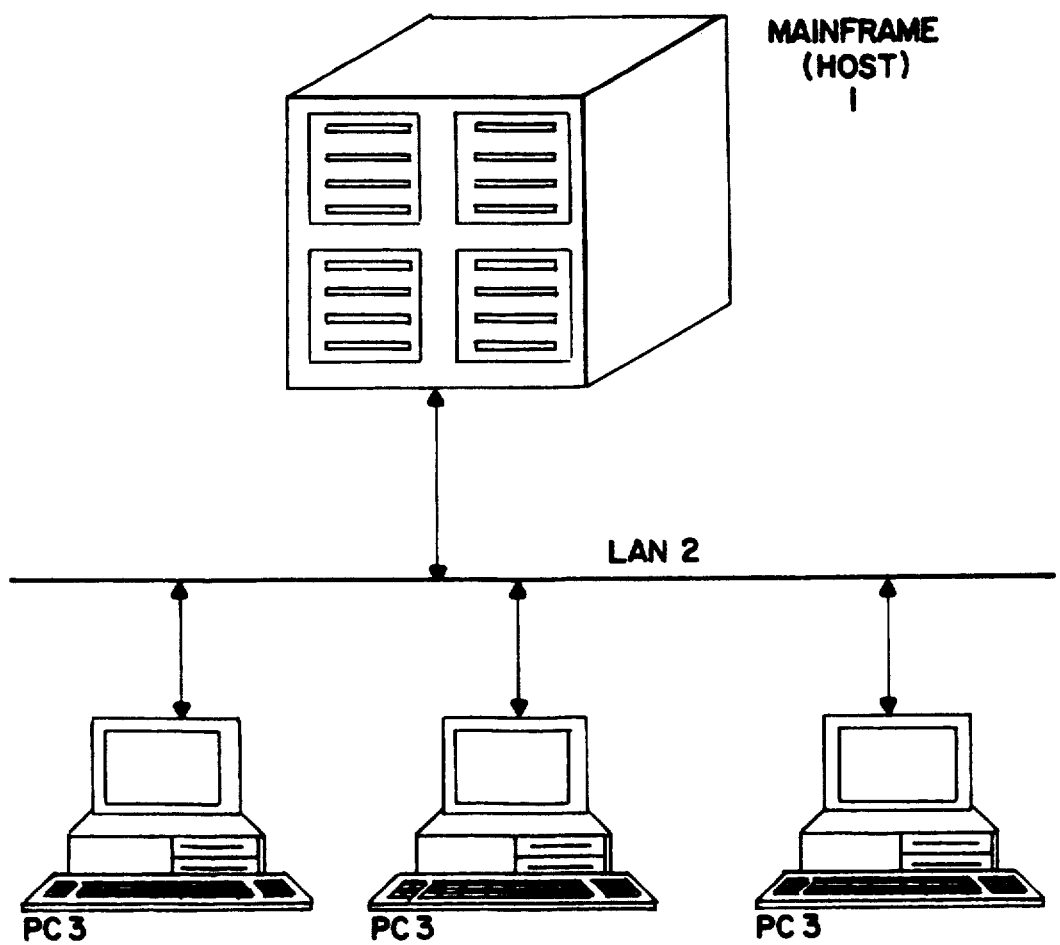
FIG. 1 depicts a computer system configured with personal computers which may function as terminals on a mainframe host.

FIG. 1 is a high level diagram of the system in which the present embodiment is practiced. A mainframe computer 1 is the host computer of the system. That is, it is the seat of intelligence and computing power for the system. By means of Local Area Network (LAN) 2, it communicates with a plurality of personal computers (PC's) 3. PC's 3 may run "terminal emulation" software which enables them to appear to mainframe 1 as terminals; thus, a user at a PC 3 may run programs in mainframe 1, inputting his data and requests at his own keyboard and viewing results on his own monitor.

PC's 3 have the ability to run as free-standing computers. For certain applications which a user may run, it may be necessary to have them function in this manner, because the terminal emulation software running in them may occupy so much memory space that there may not be room for other programs that may have to run in them. For example, if a user is running a desktop publishing program in mainframe 1, and if the desktop publishing program wishes to display a graphic to the user on his monitor, this may require a graphic interpreter program to run in the PC 3. There may not be sufficient memory in the PC 3 for the terminal emulation program and the graphic interpreter to be resident simultaneously. Thus, after the graphic description has been downloaded from mainframe 1 to PC 3, it is necessary to terminate operation of the terminal emulation software and run the graphic interpreter software. After the user has viewed the graphic, it will then be necessary to terminate the graphic interpreter program and restart the terminal emulation program.

Figure 2:
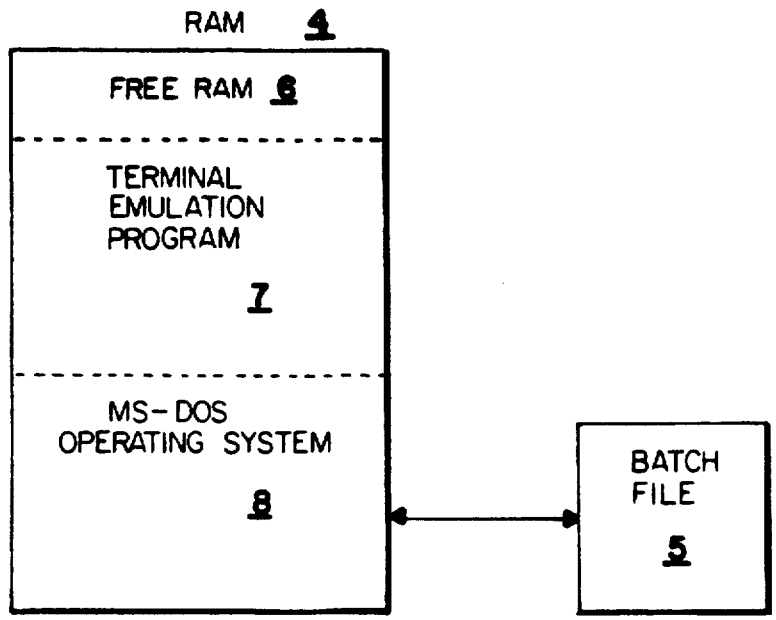
FIG. 2 is an overview of the prior art automated means of specifying the order in which programs are to be executed.

This scenario, if it is to be rigidly and immutably adhered to, could be effected by using the batch capability of MS-DOS, as depicted in FIG. 2 (prior art). FIG. 2 depicts RAM 4, in which reside MS-DOS 8 and terminal emulation program 7. Available space in RAM 4 is represented by free RAM 6, which is of insufficient size to accommodate a graphics interpreter program. Resident on the disk of PC 3 is batch file 5. The batch file function is described in Chapter 4 of the MS-DOS User's Reference. If a batch file had been provided that contained, in pertinent part:
TERMEM (assumed name for terminal emulation program)
GRAPHINT (assumed name for graphics interpreter program)
TERMEM
and if the terminal emulation program were running in response to the first shown occurrence of the "TERMEM" command, then if the terminal emulation program were to be terminated, then responsive to the batch file the next program to run would be the graphics interpreter GRAPHINT. When the user finishes viewing the graphic he would signal termination of GRAPHINT; then, responsive to the next entry, "TERMEM", in the batch file, the terminal emulation program would be run again.

However, at the time that the batch file is made up, it cannot be known for certain that that will be the order in which the user will need PC programs to be run. For example, under the aegis of the terminal emulation program, the user might run a word processing program rather than a desktop publishing program in mainframe 1; the word processing software might want to direct PC 3 to run a document preview program rather than a graphics interpreter program. The batch file quoted in part above would be of no help whatever in effecting such action. In other words, there is no provision for dynamic modification of the batch file, and thus no provision for dynamic reordering of the sequencing of programs to be run in a PC 3.

Figure 3:
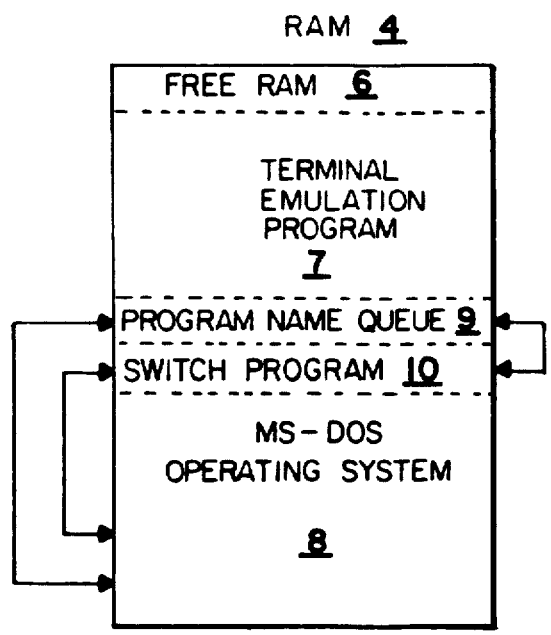
FIG. 3 is an overview of the means of the present invention for dynamically specifying the order in which programs are to be executed.

The present invention provides a means of dynamically reordering the sequence of programs. A high-level overview of the present invention is given in FIG. 3. Resident in RAM 4 are, as in the prior art, MS-DOS 8 and terminal emulation program 7. Again as in the prior art, available RAM space is represented as free RAM 6. In departure from the prior art, also resident in RAM are program name queue 9 and SWITCH program 10. Program name queue 9 functionally replaces batch file 5 of the prior art; being an area in RAM, it is susceptible of being dynamically rewritten to contain the names of programs it is presently desired to run. Upon terminating, programs give control to SWITCH program 10 rather than back to MS-DOS 8; SWITCH program 10 interrogates program name queue 9 and interrupts MS-DOS 8 in a manner (to be described in detail infra) that results in invocation of the named programs.

DETAILED OPERATION

When a program running in mainframe 1 determines that it requires a PC 3 to terminate the program it is currently running and switch to another program, it so signifies by sending to the current program in PC 3 an escape sequence. (Escape sequences are established by strong convention, as in the ANSI standards.) For example, if the terminal emulation program is presently running in a PC 3 and mainframe 1 desires that PC 3 suspend terminal emulation and run the graphics interpreter "GRAPHINT", it would send to the terminal emulation program the sequence:

ESC [ 7 q 8 G R A P H I N T
By convention, "ESC [ 7 q" means that the current program is to terminate and pass control to the program whose name is given; "8" is the length in characters of the program name; and "GRAPHINT" is that program name.

Figure 4:
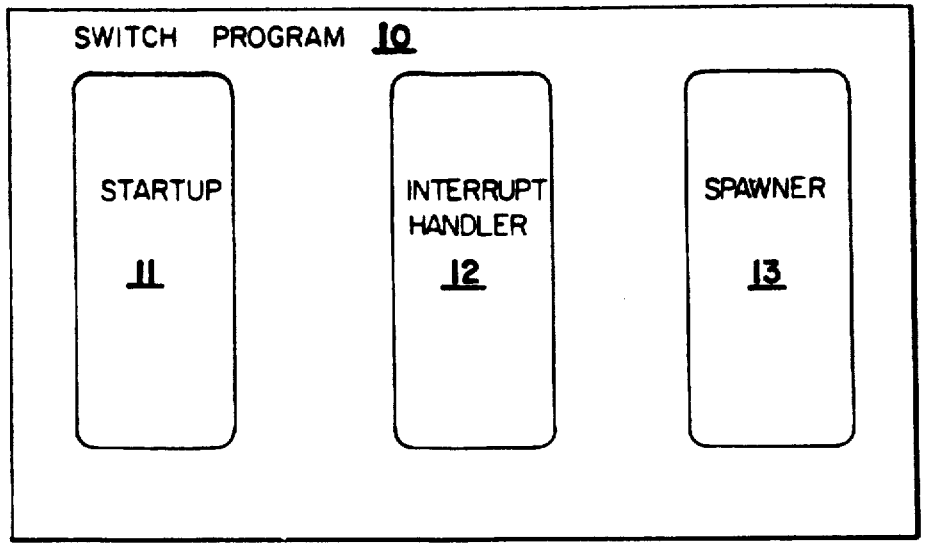
FIG. 4 is an overview of SWITCH program 10, showing it to comprise Startup program 11, Interrupt Handler 12, and Spawner program 13.

The terminal emulation program must then set up, somewhere in RAM, a string containing "GRAPHINT" followed immediately by a null byte. It must then set the DS:SI registers of PC 3 (well known to MS-DOS programmers) to point to the location of that string, and make an interrupt call that results in invocation of the SWITCH program. In the present embodiment, INT 65 was chosen for this purpose; 65 is one of the interrupt codes reserved for user interrupts (see Duncan, FIG. 13-2 at page 249). As is standard practice (see, generally, Duncan at chapter 13), an interrupt vector would previously have been provided to associate the SWITCH program with interrupt 65. FIG. 4 illustrates that SWITCH program 10 comprises three modules: Startup Program 11, Interrupt Handler 12, and Spawner program 13.

Figure 5:
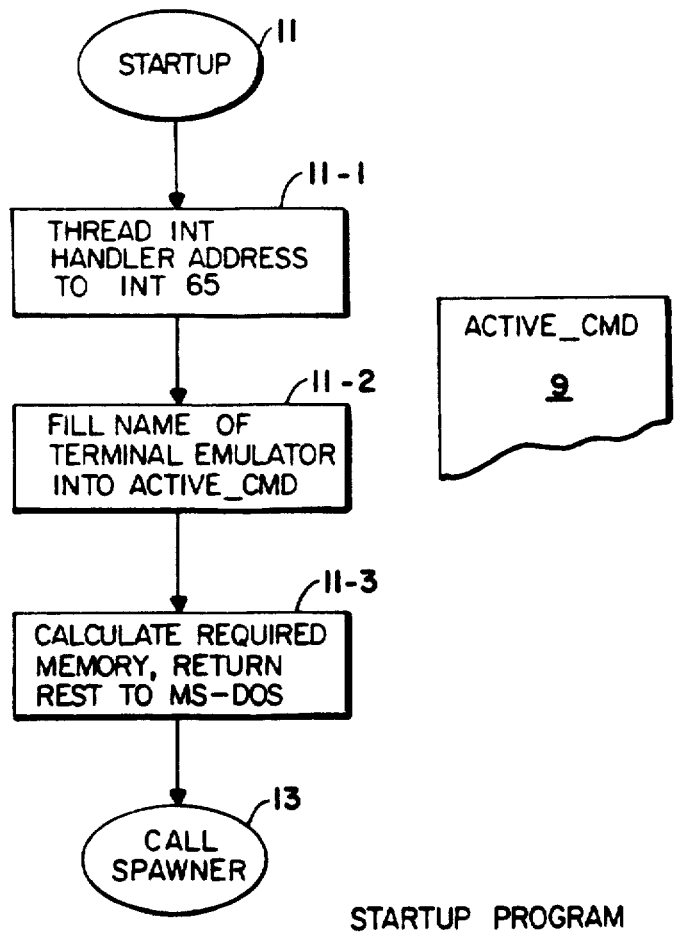
FIG. 5 is a flowchart of Startup Program 11.

FIG. 5 is a flowchart of Startup program 12, which is run only once, upon initialization ("booting") of a PC 3. (It can, typically, be run upon initialization by including it in the AUTOEXEC.BAT file, well known to PC users.) In step 11-1, it threads the address of Interrupt Handler 12 to the INT 65 vector, so that subsequent occurrences of INT 65 will dispatch to Interrupt Handler 12.

It then sets up to run the terminal emulator by filling in the name of the desired terminal emulator in Program Name Queue 9. (The name assigned to Program Name Queue 9 in coding relating to the preferred embodiment is ACTIVE_CMD). In step 11-3, it calculates the amount of memory required for the SWITCH Program 10 and Program Name Queue 9, and returns the rest for use by MS-DOS, in the manner well known to the PC programmer. Then, Startup program 12 calls Spawner Program 13, which, as will be discussed below, results in running the specified terminal emulator.

Figure 6:
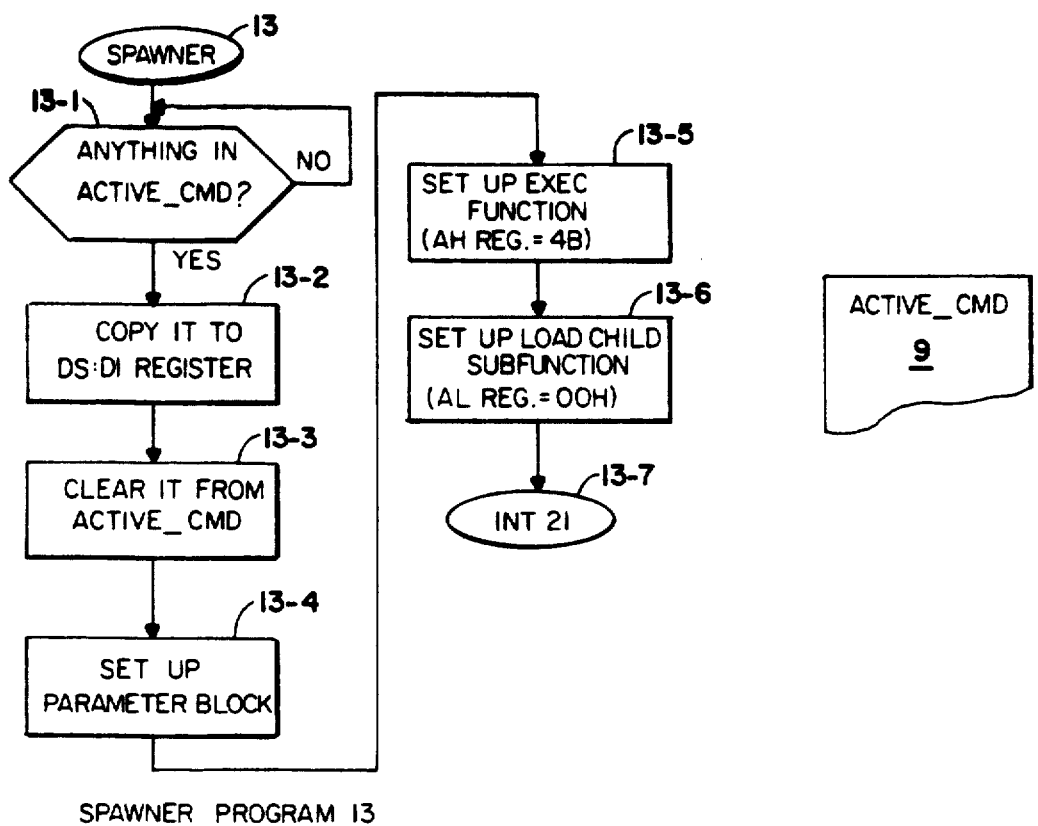
FIG. 6 is a flowchart of Spawner Program 13.

FIG. 6 depicts Spawner program 13. It checks, in step 13-1, whether there are any entries in AC-TIVE_CMD 9. If not, an embodiment might wait in a loop as shown in FIG. 6; alternative embodiments might load a default program, such as a default terminal emulator. If there is one (at least) entry, Spawner program 13 sets up to execute the named program: Step 13-2 copies the program name into the DS:DI registers, well known to PC programmers. Step 13-3 clears the entry from ACTIVE_CMD. Step 13-4 sets up the parameter block, also well known to PC programmers. Step 13-5 sets the AH register to 4B hexadecimal; with reference to Duncan at page 219, this is seen to be the function code for the MS-DOS "EXEC" function; with reference to Duncan generally at Chapter 12, this is known to be a function that will cause programs to be loaded and executed.

Step 13-6 sets the AL register to 00 hexadecimal; Duncan at page 219 reveals this to be the subfunction code for loading a "child program". Step 13-7 issues an INT 21; Duncan's chapter 12 indicates this to be a call to the aforementioned EXEC function which, with the subfunction code having been loaded by step 13-6 and the program name having been loaded by step 13-2, results in running the indicated program—thus far in the present example, a terminal emulation program.

Figure 7:
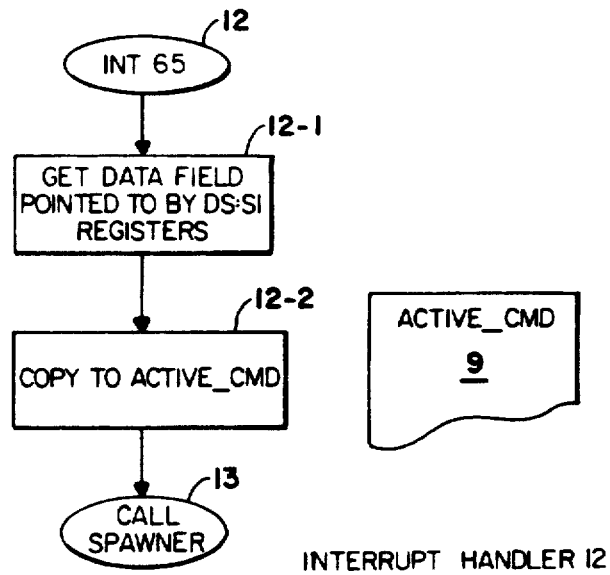
FIG. 7 is a flowchart of Interrupt Handler 12.

When the terminal emulation program (or any running program) receives the escape sequence discussed supra, indicating that another program is to be executed on the PC 3, it will (as has been noted above) copy the program name into the DS:SI registers and generate an INT 65. This invokes Interrupt handler 12, a flowchart of which is given in FIG. 7. Block 12-1 retrieves the program name from the DS:SI registers; block 12-2 copies it into ACTIVE_CMD 9, and a call is made to Spawner program 12.

Spawner program 12 has already been discussed, and from that discussion it will be obvious that the named program will be executed by means of the EXEC function of MS-DOS.

What is claimed is:

1. In a computer system comprising a host computer and one or more first computers connected to the host computer, each first computer running under control of an operating system and being provided with terminal emulation software and operating as a terminal of the host computer, means for the host computer to dynamically specify an order in which application programs are to be run on each first computer to operate on data downloaded from the host computer, comprising:

in the host computer
a means for generating escape sequences, each escape sequence including a name identifying an application program to be run on a first computer; and in each first computer,
means for receiving and storing the data downloaded from the host computer to be operated upon by an application program;
a queue means in each first computer for storing a list of names of application programs to be run to operate on the data downloaded from the host computer;
receiving means in the terminal emulation software for receiving escape sequences from the host computer, responsive to each escape sequence, for storing in the queue means the names of application programs identified in each escape sequence to be run in the first computer; and
control program means, including
interrupt means responsive to the terminal emulation software receiving means for
generating an interrupt to the first computer operating system indicating that a new application program is to be run, and
spawner means responsive to the interrupt means for
sequentially retrieving names of application programs from the queue means and for directing the operating system to run an application program designated by each name thus received; and
control transfer means
in the terminal emulation software and responsive to the interrupt generated by the control program means for transferring control to the application program designated by a name received from the queue means, and
in each application program and responsive to operation of the application program for transferring control to the control program means upon completion of operation on the data downloaded from the host computer.

* * * * *